United States Patent [19]

Sabella

[11] Patent Number: 5,724,167

[45] Date of Patent: Mar. 3, 1998

[54] MODULAR OPTICAL CROSS-CONNECT ARCHITECTURE WITH OPTICAL WAVELENGTH SWITCHING

[75] Inventor: Roberto Sabella, Rome, Italy

[73] Assignee: Telefonaktiebolaget LM Ericsson, Stockholm, Sweden

[21] Appl. No.: 555,716

[22] Filed: Nov. 14, 1995

[51] Int. Cl.$^6$ ............................................. H04J 14/02
[52] U.S. Cl. .................... 359/128; 359/124; 359/121; 359/120; 359/127; 385/24
[58] Field of Search ............... 385/24, 46; 359/124–125, 359/127–128, 117, 120–121, 163

[56] References Cited

U.S. PATENT DOCUMENTS 5,194,977  3/1993  Nishio ............................. 359/128

FOREIGN PATENT DOCUMENTS 0 310 058  4/1989  European Pat. Off. .
0 429 046  5/1991  European Pat. Off. .

OTHER PUBLICATIONS

*Photonic Switching II, Proceedings of the International Topical Meeting*, 12 Apr. 1990, Kobe, Japan, pp. 286–290, XP00033373, Nishio et al., "Photonic wavelength–division switching network using a parallel lambda–switch".
*IEEE Journal on Selected Areas in Communication*, vol. 6, No. 7, New York, US, pp. 1131–1140, XP000001576, Ikegami et al., "Semiconductor devices in photonic switching".
*Ericsson Review*, vol. 71, No. 3, Stockholm, Sweden, pp. 134–143, XP000467129, Johansson et al., "An optical transport network layer—concept and demonstrator".
IEEE, Journal of Lightwaves Technology, vol. 13, No. 2, "Performance Evaluation of an Optical Multi–Carrier Network Using Wavelength Converters Based on FWM in Semiconductor Optical Amplifiers", by Iannone et al., Feb. 1995, pp. 312–324.
IEEE, Journal of Lightwave Technoloy, vol. 11, No. 5/6, "A Transport Network Layer Based on Optical Network Elements,", by Hill et al., May/Jun. 1993, pp. 667–676.
IEEE, Photonics Technology Letters, vol. 7, No. 4, "Efficiency and Noise Performance of Wavelength Converters Based on FWM in Semiconductor Optical Amplifiers", by Ottavi et al., Apr. 1995, pp. 357–359.
"Optical Wavelength Converters" Stubkjaer et al., Proceedings of ECOC '94, vol. 2, pp. 635–642.
IEICE Transactions on Communications, vol. E77–B, No. 10, "Optical Path Cross–Connect Node Architecture with High Modularity for Photonic Transport Networks", by Watanabe et al., Oct. 1994, pp. 1220–1229.
IEEE Journal on Selected Areas In Communications, vol. 8, No. 6, "Dense Wavelength Division Multiplexing Networks: Principles and Applications", by C. Bracket, Aug. 1990, pp. 948–964.
Ericsson Review, No. 3, "An Optical Transport Network Layer—Concept and Demonstrator", by S. Johnasson et al., 1994, vol. 71, No. 3, pp. 134–143.

*Primary Examiner*—Kinfe-Michael Negash
*Attorney, Agent, or Firm*—Nixon & Vanderhye P.C.

[57] ABSTRACT

An optical cross-connect node architecture interfaces plural optical fiber input and output links, each link containing plural wavelength channels. In one embodiment, the input links are connected to an optical coupler. Pairs of tunable optical filters and optical wavelength converters are each connected to an output port of the optical coupler and perform wavelength channel routing and switching in the wavelength domain, i.e., without the need for any optical space switch. In another embodiment, an additional input wavelength converter is connected to each input fiber link to convert the plural wavelength channels on each link to different, noninterferring wavelengths. This prevents wavelength contention in the optical coupler to which the input wavelength converters are connected. New fiber links may be added in modular fashion without significant impact on the pre-existing optical cross-connect structure. Similarly, new wavelength channels may also be multiplexed onto existing fibers to provide wavelength modularity without having to reconfigure the node.

27 Claims, 6 Drawing Sheets

MODULAR OPTICAL CROSS-CONNECT ARCHITECTURE WITH OPTICAL WAVELENGTH SWITCHING

FIELD OF THE INVENTION

The present invention relates to optical communications, and more particularly, to an optical path cross-connect node architecture for optically switching/routing high speed traffic.

BACKGROUND AND SUMMARY OF THE INVENTION

Telecommunications networks are providing an ever increasing range of services which require increased capacity from existing telecommunications networks. Because a transport network is large and complex and integrates a number of different technologies and services, a network model with well-defined functional entities is useful for its design and management. Such a layered transport network architecture model includes a circuit layer, a path layer, and a physical transmission media layer. A layered structure makes it easy for each network layer to evolve independently of the other layers. Of particular interest to the present invention are links between the circuit layer and the transmission layer using path layer devices that are referred to as nodes, e.g., an electronic/digital cross-connect (DXC) node. The digital cross-connect node performs such functions as channel demultiplexing down to lower transmission hierarchies in addition to switching and routing at lower data rates. To date, optical technologies are employed mainly at the physical layer to transport high speed, time division multiplexed (TDM) digital data streams, e.g., 2.5 Gbit/s data streams.

Compared to the high speeds at which data can be transported over optical links, e.g., 2.5 Gbits/s, the electronic path layer nodes operate at much slower rates, e.g., 155 Mbit/s. To meet the increased capacity needs of the transport network, bottlenecks caused mainly by use of electronic node switching and routing need to be eliminated. An object of the present invention therefore is to eliminate such bottlenecks and add a "transparent" optical layer to the path layer of existing telecommunications networks which uses optical cross-connect (OXC) nodes to perform high speed (e.g., 2.5 Gbits/s) dynamic routing and allocation of wavelength channels. Thus, a signal transmitted from a sending device may routed through several optical cross-connect nodes at the path level without ever passing through an electrical cross-connect node.

Significant benefits of this network structure are that optical cross-connect nodes route very large amounts of data through the transport network at the path layer without requiring opto-electronic conversion and the losses associated with such conversions. In addition, high speed transmission over the optical path layer is "transparent" to the network. Not only can traffic be routed through the optical cross-connect at rates much faster than through electronic cross-connects but also the optical layer transmission rate can be easily increased, e.g., from 2.5 Gbits/s to 10 Gbits/s, without impacting the optical or digital layers that make up the basic path layer. In this way, the network can be upgraded to a much higher traffic transport rate through the optical cross-connect nodes without modifying the cross-connect node structure.

An optical cross-connect node that employs an optical space switch matrix to perform channel switching suffers from a number of drawbacks. First, optical space switches are relatively expensive so the initial cost of implementing an optical cross-connect node is high. Second, space switches are complicated devices. In fact, adding capacity to a node means adding an enormously more complicated space switch. Third, space switches are inflexible. Fiber optic links cannot be modularly added to an existing space switch. Instead, for newly added links, a new space switch must be designed and installed at very high cost. A fourth drawback relates to inflexibility. Because the wavelength channels "mix" in an optical cross-connect node, wavelength contentions will occur unless different input wavelength channels are used thereby limiting wavelength reuse.

It is an object of the present invention to provide an optical cross-connect node architecture that is economical, simple, and flexible.

It is an object of the present invention to provide an optical cross-connect node architecture that provides both optical link modularity and wavelength modularity.

It is a further object to achieve such modularity without significantly impacting the existing architecture so that individual fiber links and/or wavelengths can be added on an as needed basis without having to reconfigure the node.

It is a further object to provide a optical cross-connect architecture that provides wavelength switching and routing without requiring use of an optical space switch.

It is an object of the present invention to employ photonic, wavelength conversion to avoid wavelength contentions in the node (thereby permitting wavelength reuse) and to permit multicasting of wavelength channels to any wavelengths and/or optical fibers used in the network.

Using photonic, wavelength converters and tunable optical filters to switch and route wavelength channels through an optical cross-connect node, the present invention eliminates the need for space switches to effect selective traffic routing/switching/multicasting functions. Eliminating the need for optical space switches from the optical cross-connect considerably reduces the costs of implementing an optical, cross-connect node. However, the architecture of the present invention could be used with space switches if desired. In addition, the optical cross-connect node architecture of the present invention provides considerable design flexibility and even further economy because of its modularity. Modularity is particularly desirable because, as optical path layers are added to existing networks, it is likely that initial capacity demands will be relatively small, and as a result, cost will be a significant factor in upgrading existing networks or establishing new networks. Modular costs limited to each link or wavelength added are more acceptable than the costs associated with replacing other existing and expensive components in the node like a space switch. Using the present invention, the transport network capacity at the path/node level can be easily increased by simply adding new links and/or wavelength channels without having to replace an entire space switch at considerable effort and cost.

The modular optical cross-connect node architecture includes plural optical fiber input links each containing plural wavelength channels. Each fiber link is connected to an input port of an optical coupler such as (but not limited to) a star coupler. In contrast to an expensive space switch which is an "active" switching device, the star coupler is inexpensive and a passive device. Each output port of the optical coupler is connected to a tunable optical filter which is tuned to a wavelength of the channel to be connected to an output fiber. Accordingly, the tunable filter, by being tuned to a particular wavelength, selects or routes a wavelength channel having that particular wavelength from an output port of the optical coupler to an output optical link. This operation is referred to as wavelength channel routing.

The tunable filter output is connected to a corresponding wavelength converter which performs what is referred to as wavelength channel switching. In other words, the wavelength converter shifts, if desired, the input wavelength to a different output wavelength. As a result, the information contained on one wavelength channel may be "switched" to another wavelength channel. Output signals from each wavelength converter are combined at various combiners nodes to multiplex plural wavelength channels onto a single optical fiber link, i.e., wavelength division multiplexing. No optical space switch is required because the wavelength channels are switched in the wavelength domain rather than in the space domain. A digital/electronic cross-connect may also be coupled to the optical cross-connect at the optical coupler through electro-optical transmitters and receivers.

In another embodiment, the highly modular, optical cross-connect node interfaces plural optical fiber input links and plural optical fiber output links which each contain plural wavelength channels. Each input link is connected to an input wavelength converter for translating an input set of wavelength channels wavelength division multiplexed (WDM) onto a single input optical fiber link (referred to as a "WDM comb" of wavelength channels) to another set of wavelengths. The output of each input wavelength converter is connected to an input port of an optical coupler. By properly translating the input WDM combs to different, noninterfering wavelengths, optical wavelength contentions in the optical coupler are avoided. Each output port of the optical coupler is connected to a corresponding pair of a tunable optical filter and a wavelength converter for routing a desired wavelength channel from the optical coupler to an output link and translating the routed wavelength to an original input wavelength. The wavelength channel outputs from various wavelength converters are multiplexed onto an optical fiber link via corresponding optical combiner.

An advantage of this modular optical cross-connect architecture is that new fiber links may be easily and inexpensively added in a truly modular fashion. More specifically, all that is needed to add a new optical fiber link is to add the following optical components associated with the new link: an input wavelength converter, an output tunable filter, an output wavelength converter, and an output combiner. If the optical coupler has extra input and output ports, the existing optical coupler may be used. Even if all of the optical coupler ports are used, the existing coupler need only be replaced with a new, larger capacity optical coupler. Because passive optical couplers are relatively inexpensive, the addition of the new fiber link which does require a new optical coupler nonetheless has very small impact on the existing structure of the optical cross-connect node. Similarly, the number of wavelengths carried on each fiber can be easily increased in an inexpensive manner. Each new wavelength channel requires only that an additional output tunable filter/wavelength converter pair. In other words, for each newly added wavelength channel, there needs to be one tunable filter/wavelength converter pair added to an output of the optical coupler. The existing pairs of tunable filters/wavelength converters are not affected. Again, the only component that may need to be changed is the optical coupler so that it includes as many output ports as the total number of wavelength channels.

Therefore, using the architectures disclosed herein, new wavelengths and/or links can be modularly added together or separately in simple fashion. Using as an example adding new fiber links to one of the disclosed architectures, the number of links to be added is determined. For each link to be added, the link is coupled through an additional input wavelength converter to an available input port of the optical coupler. An additional tunable filter and corresponding output wavelength converter are coupled to an available output port of the optical coupler. An output from the additional wavelength converter is connected to an optical combiner.

Another advantage of the architectures in accordance with the present invention is the multicasting of a single input wavelength channel to multiple output wavelength channels and fiber links. One beneficial application includes generating an original signal at a central location and broadcasting that signal from one optical cross-connect node over the transport network to other cross-connect nodes located in different geographical locations.

These and other objects and advantages of the invention will now be described further below in conjunction with the drawings.

DETAILED DESCRIPTION OF THE DRAWINGS

In the following description, for purposes of explanation and not limitation, specific details are set forth, such as particular circuits, circuit components, interfaces, techniques, etc., in order to provide a thorough understanding of the present invention. However, it will be apparent to one skilled in the art that the present invention may be practiced in other embodiments that depart from the specific details. In other instances, detailed descriptions of well-known methods, devices, and circuits are omitted so as not to obscure the description of the present invention with unnecessary detail.

Figure 1:
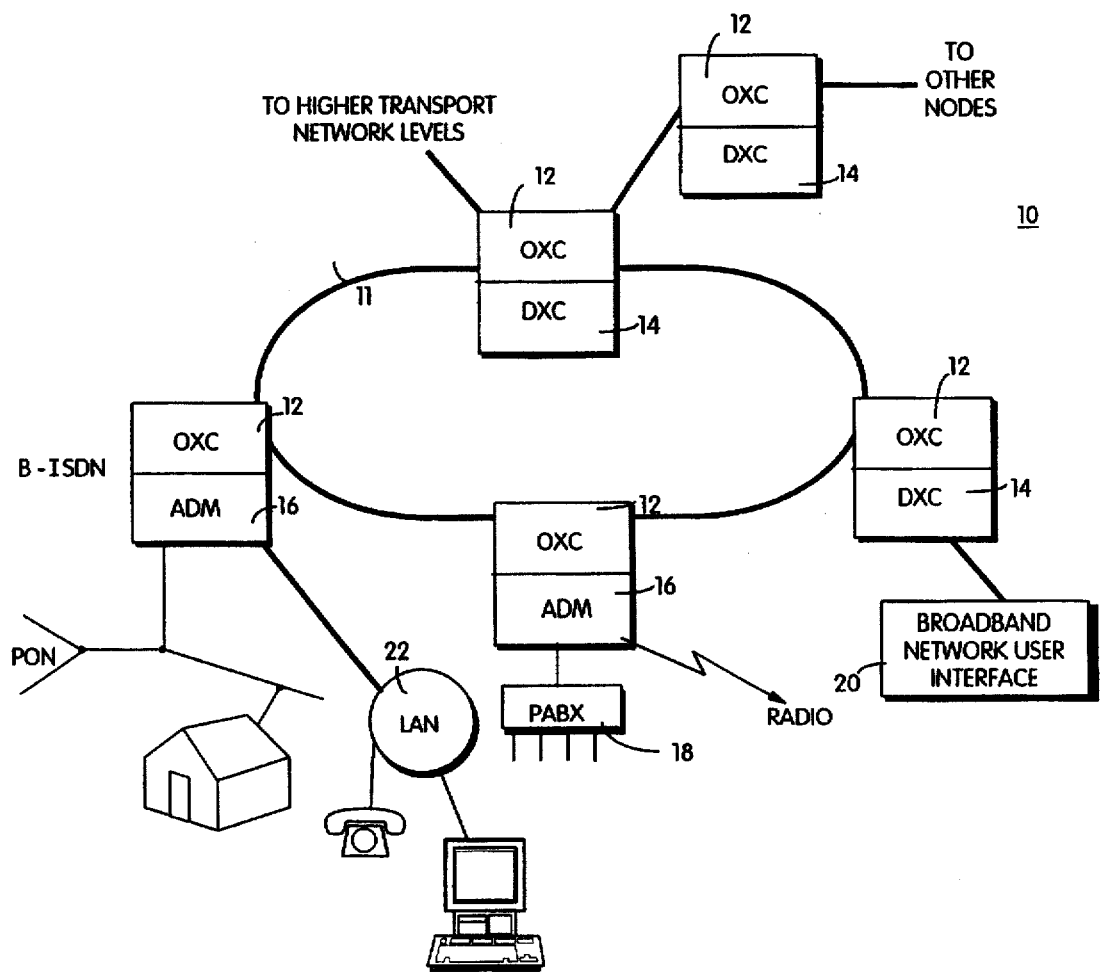
FIG. 1 is a diagram illustrating an optical communications layer in a local transport communications network.

Referring to FIG. 1, a transport network that is readily adaptable to future evolution in network topologies and transmission protocols includes a "transparent" optical layer 10. Transparent means that the optical layer does not affect and is otherwise invisible to the data rates and protocols used on the existing electrical layer of the network path layer. The optical layer 10 is added to the path layer of the transport network through a number of flexible network nodes that interface an optical link 11 (optical links are illustrated as thick, bold lines) with optical cross-connect nodes 12 (sometimes simply referred to as optical cross-connects (OXCs)). In general, the OXCs 12 allow dynamic routing and switching/allocation of optical wavelength communications channels at very fast speeds (each wavelength carries a single traffic channel). The traffic signals, although typically digital in nature, may also include analog signals. For purposes of explanation only, however, the present description assumes that the traffic consists of high speed digital bit streams.

Demultiplexing and routing at lower/slower bit rate transmission hierarchies is accomplished by switching the signals from the optical layer to electronic/digital cross-connects (DXCs) 14 using electro-optical transceivers (not shown) which rearrange the data. For example, the DXCs perform time division demultiplexing of signal channels carried in one traffic channel and perform routing, switching, and other digital processing functions at considerably slower speeds. A number of potential network applications are shown interfaced by OXCs to the optical network 11 including a user interface to the electronic broadband network 20, interface with a private automatic branch exchange (PABX) 18 via an add/drop multiplexer (ADM) 16, access to the broadband-ISDN (B-ISDN), homes, and interface to smaller networks like local area network (LAN) 22.

While photonic switching in the space and wavelength domains may be advantageously employed to increase capacity in existing and broadband communication systems, photonics is not particularly well suited to perform data processing and data storage functions which can be more optimally performed by the electronic layer. With this combined node architecture, the "best" features of both (1) optical and (2) electronic technologies are utilized: (1) relatively simple optical routing and switching of general traffic channels at very high speeds and (2) more complicated electronic routing, switching, and processing of individual signal channels at slower speeds. By using photonic and electronic techniques in this kind of complementary manner, the total traffic throughput of the network is considerably increased. Moreover, optical cross-connects transparently route large blocks of traffic not only at high speeds but also with high efficiency because opto-electronic conversions are not required for straight forward traffic transmission through the path node over the transport network.

Wavelength division multiplexing (WDM) is used to establish multiple, independent optical channels on a single fiber. In contrast to time division multiplexing (TDM) used to optimize copper wire and radiowave channel bandwidth, fiber bandwidth is most easily accessed in the wavelength domain directly. In concept, wavelength division multiplexing couples or multiplexes separate channel sources (input links) into a single communications fiber and separates or demultiplexes the signals out of the single fiber. Fundamentally, wavelength division multiplexing is the same as frequency division multiplexing as that term is used in electrical (copper) or electromagnetic (radio) transmission systems. Of course, the relationship $V=F \times \lambda$ relates wavelength to frequency.

Figure 2:
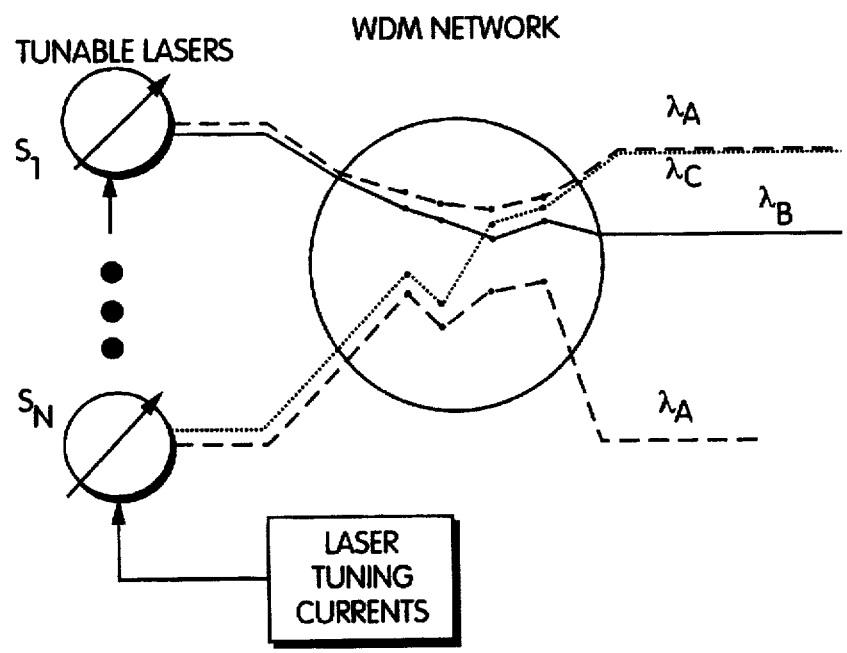
FIG. 2 is a diagram of a wavelength routing network.
Figure 3:
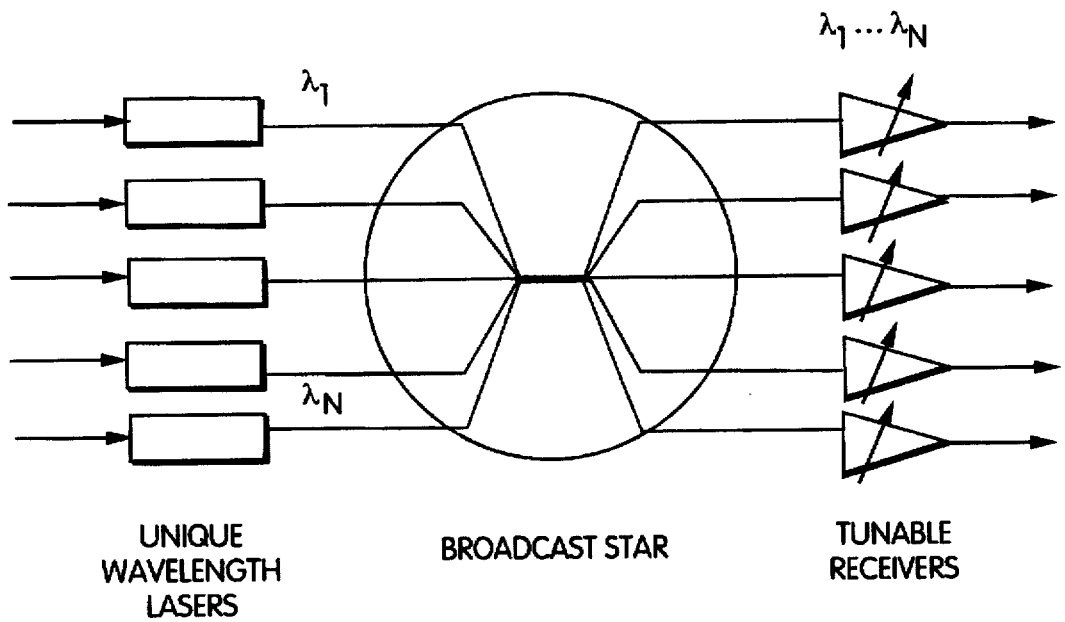
FIG. 3 is a diagram of a broadcast-and-select network with fixed wavelength lasers and tunable receivers.

Two general architectures that may be used in WDM networks are wavelength routing networks and broadcast-and-select networks are illustrated in FIGS. 2 and 3. A wavelength routing network shown in FIG. 2 is composed of one or more wavelength selective elements such as tunable lasers. The path that a signal makes through the network is determined by the wavelength of the signal and the input port at which the signal enters the network. The N tunable laser sources ($S_1$–$S_N$) controlled by appropriate tuning currents are interconnected with N wavelength independent receivers (not shown) through a WDM network. By tuning to a selected wavelength, the signal from a given laser can be routed to a selected output. A broadcast and select network, shown in FIG. 3, combines all of the unique wavelength laser inputs in a star coupler and "broadcasts" them to all outputs. The architecture is based on fixed or tunable input lasers and fixed or tunable output receivers.

The present invention uses wavelength division multiplexing and accomplishes optical routing and switching of multiplexed wavelength channels using tunable filters, wavelength converters and optical couplers without using an optical space switch. Using the optical cross-connect architecture of the present invention, an input wavelength channel may be assigned to any other wavelength channel on a link-by-link basis. This virtual wavelength path technique is advantageous because it minimizes the total number of required wavelengths in the network. In a wavelength path scheme, each optical path is established between two nodes by allocating one wavelength for the path. As a result, a different wavelength must be allocated for each wavelength path in any link throughout the entire network. In a virtual wavelength path scheme, the wavelengths are allocated on a link-by-link basis, and therefore, the wavelength of the optical path is converted node-by-node. As a result, a smaller number of total network wavelengths are required in the virtual wavelength path scheme.

Different methods/devices may be used to obtain optical wavelength conversion. Most optical wavelength conversion devices exploit nonlinear effects in semiconductor devices. Examples of optical wavelength conversion methods that may be employed in the present invention include all-optical and opto-electronic wavelength converters. Specific examples include: gain saturation in semiconductor optical amplifiers (SOA), refractive index modulation in a semiconductor optical amplifier on a branch of a Mach-Zenhdr interferometer, and four wave mixing (FWM) in the semiconductor optical amplifiers. These specific wavelength conversion methods present a large detuning bandwidth and optical control of detuning via tunable lasers. Of course, if opto-electronic converters are employed, transparency to bit rate and transmission format is lost. For purposes of simplifying the explanation of the present invention, only the following description is based on an example using four wave mixing in a semiconductor traveling wave optical amplifier type wavelength converters. In addition, this type of wavelength converter is advantageous because it permits frequency translation independent of signal modulation format, processes very high bit rate signals, (i.e., above 40 Gbit/s), and can wavelength translate an entire wavelength division multiplexed "comb" or set of wavelengths present on an optical fiber. Moreover, FWM converters can be used to translate analog signals, e.g., CATV signals.

An optical cross-connect architecture for effecting pure wavelength switching in accordance with one embodiment of the present invention is now be described in conjunction with FIG. 4. In this optical cross-connect architecture, wavelength channel routing and switching is entirely performed in the wavelength domain using tunable filters and wavelength converters. For purposes of explanation only, three optical fiber input links are connected to the optical cross-connect 50 with each fiber link carrying plural wave division multiplexed channels. Of course, more than three links could be accommodated. In this embodiment, in order to avoid channel contentions within the optical cross-connect, the carrier wavelength "combs" multiplexed onto different optical fiber links must occupy adjacent, nonoverlapping portions of the optical spectrum. The same configuration of three output optical fiber links are shown leaving the optical cross-connect 50. The optical signals on each fiber link may be amplified using suitable optical amplifiers 58a, 58b ... 58n, such as erbium-doped fiber amplifiers (EDFAs). Similarly, output EDFA amplifiers 68a, 68b ... 68n may be provided to amplify the output signals generated by the optical cross-connect. Although these amplifiers are not essential to the optical cross-connect architecture, they are desirable to boost the signal level because of the combined losses of the fiber path and the components in the optical cross-connect node.

The wavelength channels coming from the input fiber links 1, 2, and 3, as well as optical wavelength channels locally generated by electro-optical transmitters 54 connected to digital cross-connect (DXC) 52, are combined by an optical coupler 60, such as a star coupler, that broadcasts the combined signal to each of the coupler's output ports. The star coupler outputs are grouped into 3 groups of N outputs, (N being the number of wavelength channels), one group for each output fiber. This means that the entire set of wavelength channels entering the node is made available on each output port of the optical coupler. As a result, any wavelength channel may be routed from any input fiber to any wavelength channel of any output fiber link. The outputs of the optical coupler 60 are connected to respective tunable filters 62. Six tunable optical filters 62a–62f are shown to illustrate the nonlimiting, simplest example where each input and output fiber link includes two wavelength channels. As a result, there are a total of six (3 links×2 channels) possible wavelengths to be selectively routed to any one of the output links. Of course, more than two wavelength channels may be multiplexed on to a single fiber. Each output port of the optical coupler 60 then is connected to one of the tunable optical filters 62a–62f which is tuned to one of the six possible wavelength channels. Accordingly, the tunable filter 62, by being tuned to a particular wavelength, selects or routes a wavelength channel having that particular wavelength from the optical coupler 60 to its output optical fiber link, i.e., wavelength channel routing.

Each tunable filter's output is connected to a corresponding wavelength converter 64a–64f which performs wavelength channel switching. In other words, the wavelength converter shifts, if desired, the input wavelength to a different output wavelength. As a result, the information contained on one wavelength channel is "switched" to another wavelength channel. Of course, the wavelength converter need not switch the wavelength if the channel is already at the desired wavelength. Output signals from each wavelength converter 64a–64f are combined at corresponding combiners 66a–66c to multiplex plural wavelength channels onto a single optical fiber link, i.e., wavelength division multiplexing. In this nonlimiting example, since there are two wavelength channels per link, each combiner multiplexes two frequency converter outputs onto a single output link.

No optical space switch is required because the wavelength channels are switched in the wavelength domain rather than in the space domain. The use of wavelength converters as switching elements increases network flexibility, simplifies management of the network, and reduces the cost of the optical cross-connect.

Any suitable tunable filter could be used for elements 62a–62f such Fabry-Perot and acousto-optic filters and active filters on Distributed Bragg Reflector (DBR). These devices have the advantages of optical gain, narrow filter linewidth, and potential for multifunctionality as well as monolithic integration with other opto-electronic devices.

Figure 5:
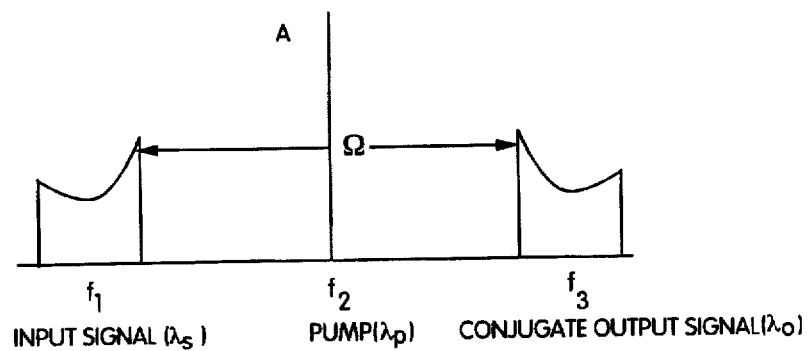
FIG. 5 is a diagram to illustrate the principles of operation of a wavelength converter.
Figure 6:
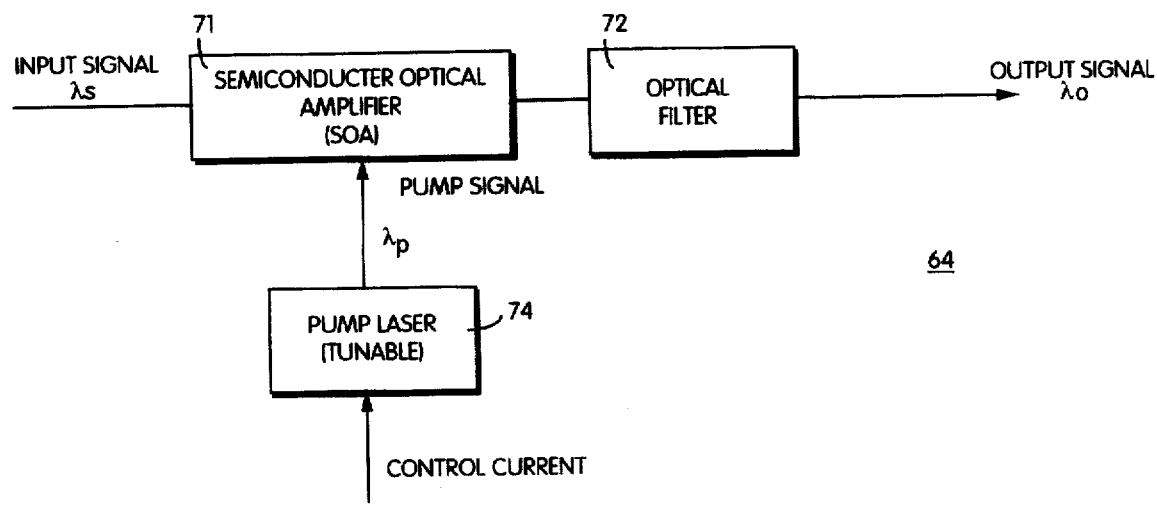
FIG. 6 is a function block diagram illustrating example control of a four wave mixing semiconductor optical amplifier wavelength converter in accordance with a preferred embodiment of the invention.

An example wavelength converter based on four wave mixing (FWM) in semiconductor traveling wave amplifiers (SOAs) is now described in accordance with FIGS. 5 and 6. Four wave mixing is a nonlinear effect that takes place when two waves at different wavelengths are injected into a semiconductor optical amplifier. Referring to FIG. 5, a frequency converter based on FWM in an SOA is obtained by injecting at the SOA input an input signal $\lambda_s$ to be converted (centered at frequency $f_1$) and an optical pump $\lambda_p$ (at frequency $f_2$) with the same linear polarization. Material optical nonlinearities in the SOA produce a third output field $\lambda_c$ (which is the conjugate of the input signal $\lambda_s$, centered at frequency $f_3$) shifted in frequency by $\Omega=f_3-f_1$ which is the detuning between pump and input signal. The field at frequency $\lambda_c$ has the same spectrum of $\lambda_s$ (but with a reverse frequency spectrum) so that the signal modulation is preserved, and the carrier wavelength of $\lambda_s$ is translated by a conversion interval $\Delta\lambda=\lambda_c-\lambda_s$.

Different physical phenomena can cause four wave mixing in a semiconductor optical amplifier including carrier density pulsation induced by pump signal "beating" (i.e., referring to beat frequency) inside the active region or by nonlinear gain and index saturation due to intraband carrier dynamics. When the input signal is injected into a laser at frequency $f_1$ which is slightly detuned with respect to the lasing or pump frequency $f_2$, a modulation is produced at the beat frequency of the carrier density, and consequently, of both the gain and refractive index. The frequency (through the refractive index) and the intensity (through the gain) modulations of the field generate two sidebands in the spectrum. One of them is the same frequency as the injected field, and the other is at a frequency of $2f_2-f_1$. When the injected field is modulated at low frequency with respect to the difference between $f_1$ and $f_2$, the output of the new frequencies are also modulated. The modulation is the conjugate $f_3$ of the input signal $f_1$ if the gain nonlinearity is independent of frequency.

An example frequency conversion scheme is shown in FIG. 6. Input optical waves including the signal $\lambda_s$ and the pump $\lambda_p$ are coupled to a semiconductor optical amplifier 71. The pump signal is generated by a tunable pump laser 74 regulated by an appropriate control current. Thus, by changing the control current and therefor the pump, the wavelength translation amount is easily changed. The input signal and the pump have a frequency difference of $\Omega$ and when combined, as described above with respect to FIG. 5, induce a modulation of the carrier density at that frequency difference. The modulation affects the entire gain spectrum because of the homogeneity of the gain saturation. The input signal can be translated to any other wavelength in the optical spectrum. The optical filter 72 is tuned to suppress the pump and original signal from the SOA output to leave only the wavelength translated output signal.

The FWM SOA wavelength converter can be used to wavelength convert a single wavelength channel or an entire comb/set of wavelength channels by an amount $\Omega$. The FWM conversion process is independent of the signal or its spectrum. As a result, an intensity modulated signal, a WDM comb of intensity modulated signals, and even analog signals can be wavelength converted using this FWM conversion process.

Figure 7A:
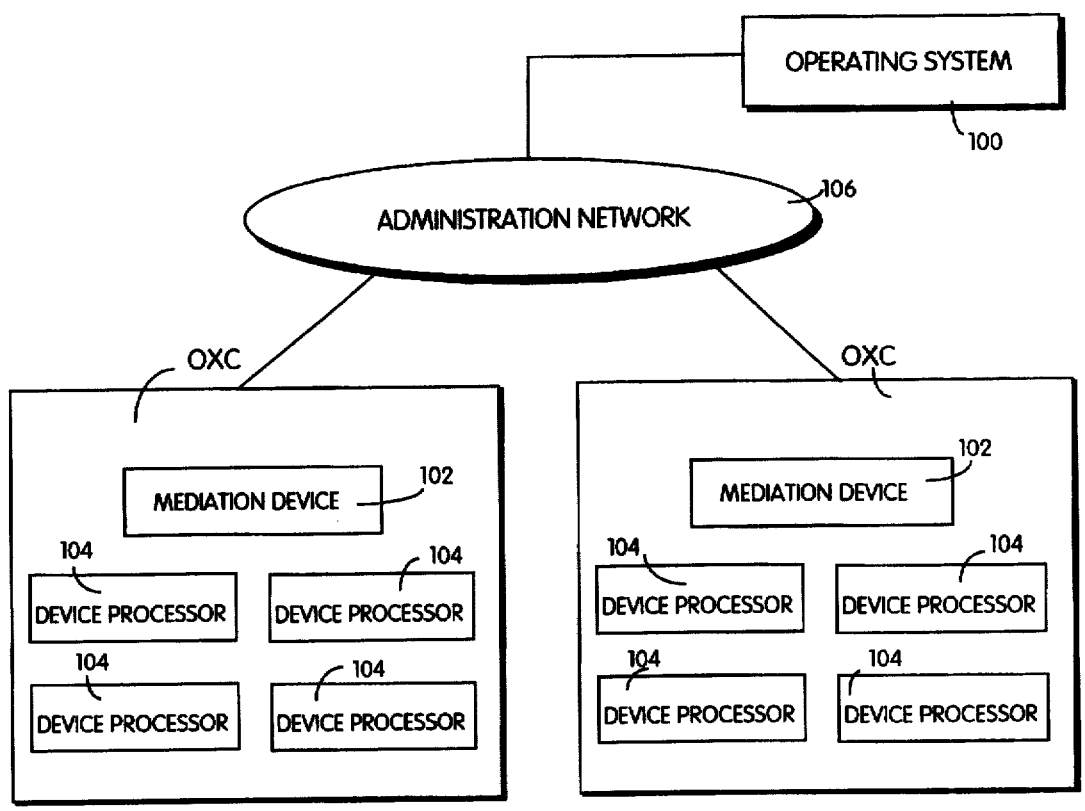
FIG. 7(a) is a function block diagram of a management system for controlling an optical cross-connect.
Figure 7B:
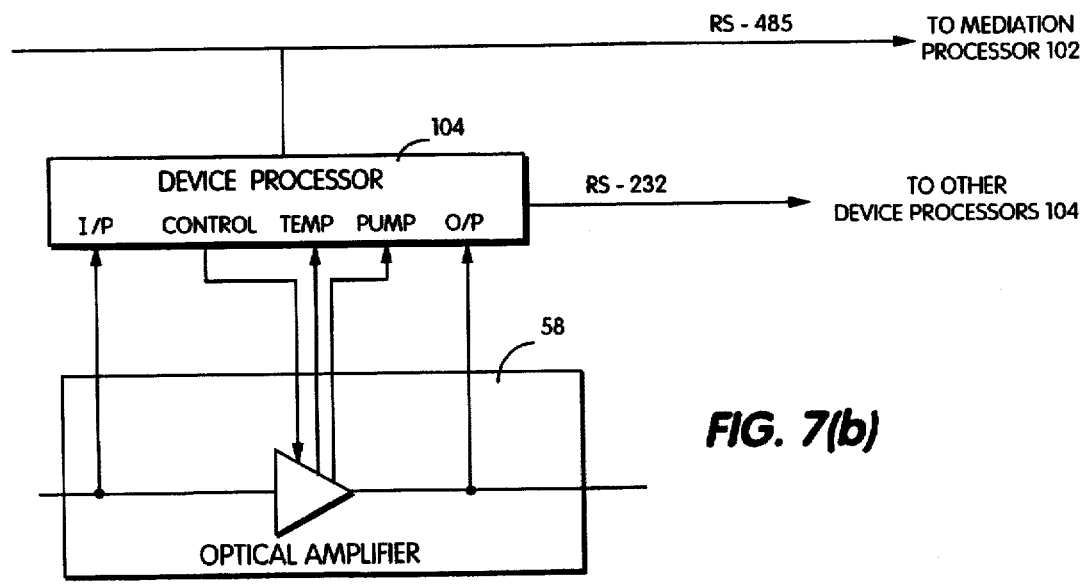
FIG. 7(b) is a function block diagram showing example control of an individual optical device.

FIGS. 7A and 7B illustrate a management system architecture for controlling a plurality of optical cross-connects. The management architecture includes three processor layers including the operating system 100, mediation devices 102, and device processors 104 connected over a separate "administration network 106". The operating system 100 allows an operator to reconfigure the network, set up protection paths, and supervise status. A man machine interface may be provided at the operating system 100 to graphically display the overall network configuration or the configuration of individual nodes. Configuration management automatically establishes channels between the end terminals in the network by allocating appropriate wavelength channels and setting up connections automatically using a routing algorithm that calculates and automatically selects free paths and channels. One mediation device is located at each cross-connect node and distributes commands for the operating system to the device processors. The principle task of the mediation device is to maintain the communication link; however, additional functionality may be allocated to the mediation devices, e.g., control of signal level equalization across the node.

One mediation device 102 is located at each cross-connect node and distributes commands from the operating system 100 to the device processors 104. A principle task of the mediation device 102 is to maintain this communication link, but the mediation devices may also perform other functions such as control signal equalization across a node. Communication between each mediation device and device processors is accomplished over an RS-485 bus. Device processors 104 in each optical cross-connect control and monitor all necessary parameters. For example, in the case of optical amplifiers, input and output power, pump power currents, and temperature may all be monitored. Consider the optical amplifier shown in FIG. 7. The input power, output power, pump power current, and temperature may all be monitored as indicated. The device processor 104 processes both analog and digital signals and connects to other device processors using an RS-232 bus.

Figure 8:
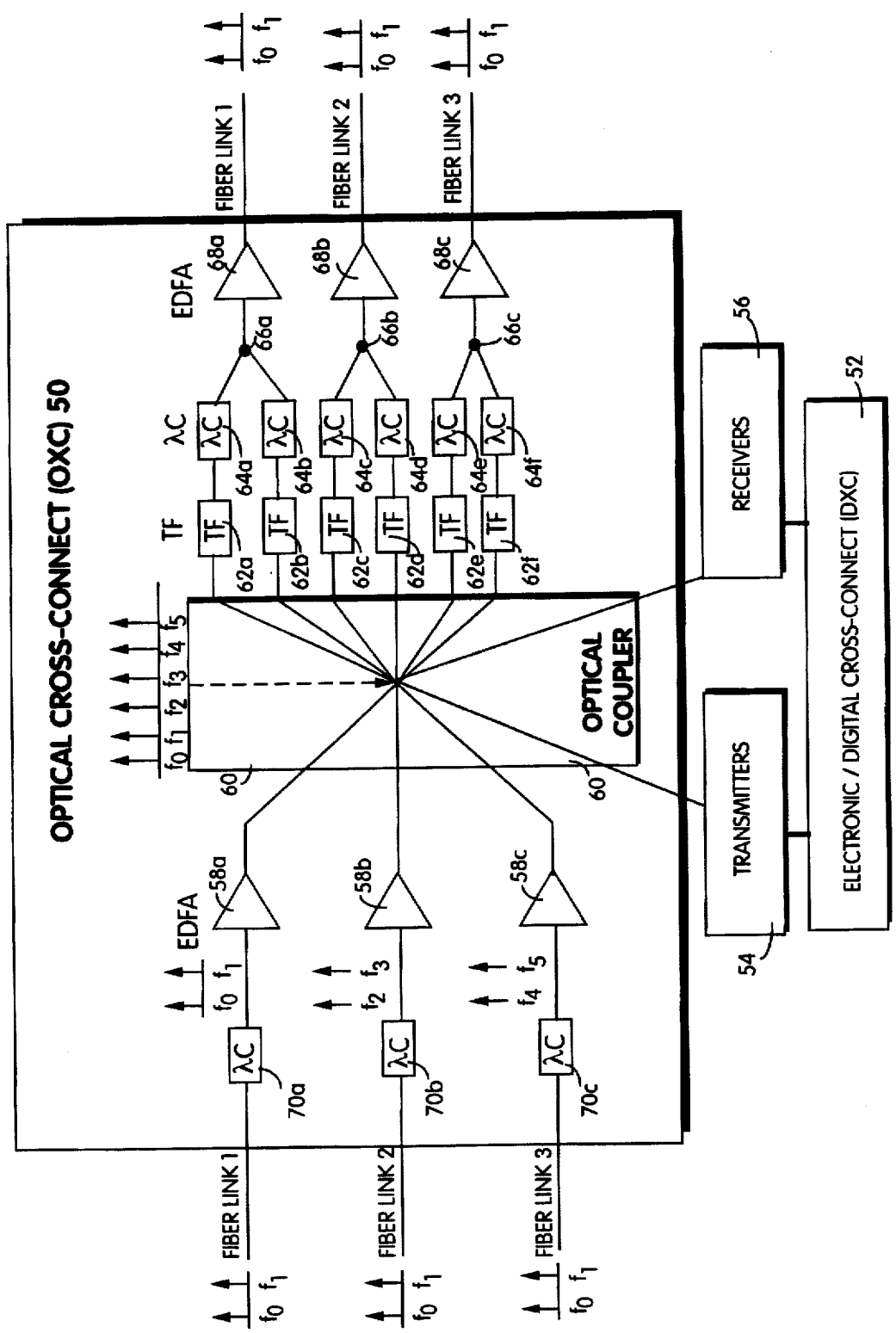
FIG. 8 is a function block diagrams of a highly modular optical cross-connect architecture using wavelength switching in accordance with another embodiment of the present invention.

Another embodiment of a modular optical cross-connect architecture will now be described in accordance with FIG. 8 where similar elements from FIG. 4 have similar reference numerals in FIG. 8. One of the drawbacks of the optical cross-connect architecture shown in FIG. 4 is that wavelength contentions occur in the star coupler 60 if the input fiber links carry the same wavelengths. Therefore, wavelength reuse is prevented in the network because all of the wavelength channels must be different to avoid such contention in the node. FIG. 8 illustrates wavelength/frequency reuse in the network in that each of the input links 1, 2, and 3 includes similar frequencies (corresponding to wavelengths) f0 and f1. Again, for purposes of illustration, only three fiber links and two wavelength channels per link are shown.

Four wave mixing in semiconductor optical amplifiers performs two significant functions in the OXC architecture shown in FIG. 8: photonic switching and wavelength contention avoidance. The photonic switching function performed in the FIG. 8 architecture was already described above in conjunction with the description of the is OXC architecture of FIG. 4. With respect to the latter function, the use of wavelength converters avoids wavelength contentions that would occur at a node when two channels at the same wavelength are routed to the same node output. By shifting the wavelength of one of the channels to a different wavelength, such contention is avoided thereby achieving a more reliable and flexible optical network. In a situation where plural wavelength channels are multiplexed onto one link, FWM SOA wavelength converters are used to shift the entire WDM comb on each fiber link before the channels mix in the optical coupler.

In accordance with this embodiment of the present invention, input wavelength converters 70a, 70b, and 70c shift the input frequencies of each optical wavelength channel to a different set of frequencies. As with the example used with respect to FIG. 4, the example in FIG. 8 assumes only three fiber links with each link carrying only two wavelength channels. However and in contrast to FIG. 4, the two wavelength channels on each input fiber link in FIG. 8 are the same—f0 and f1. Of course, a much larger number of links and wavelength channels could be used. Thus, the comb of input frequencies f0 and f1 on each fiber link may be shifted by its wavelength converter 70 to another comb or set of frequencies. In the example, the input wavelength frequencies f0 and f1 on optical link 1 are not translated by wavelength converter 70a (although they could be if desired). The wavelength channels f0 and f1 on optical link 2 are converted in wavelength converter 70b to frequencies f3 and f4 respectively. The wavelength channels f0 and f1 on optical link 3 are converted in wavelength converter 70c to corresponding frequencies f5 and f6 which are different from frequencies f3 and f4. As a result, individual wavelength channels coupled in optical coupler 60 do not collide/contend. To accomplish wavelength translation of such simplified WDM combs, FWM SOA wavelength converters are used at the inputs to the optical coupler 60.

The pairs of tuning filters 62a–62f and wavelength converters 64a–64f already described above with respect to FIG. 4 perform routing of different channels to the output fibers and wavelength switching in the wavelength domain, respectively. The wavelength converters 64a–64f may, if desired, translate the f3 and f4 channels as well as f5 and f6 channels back to the corresponding f0 and f1 frequencies (wavelengths) which were received by wavelengths converters 70. This feature permits the node wavelength switching function to remain transparent outside the node. Similarly, the outputs from pairs of wavelength converters are combined in respective combiners to reconstitute the WDM channels on each link.

Figure 4:
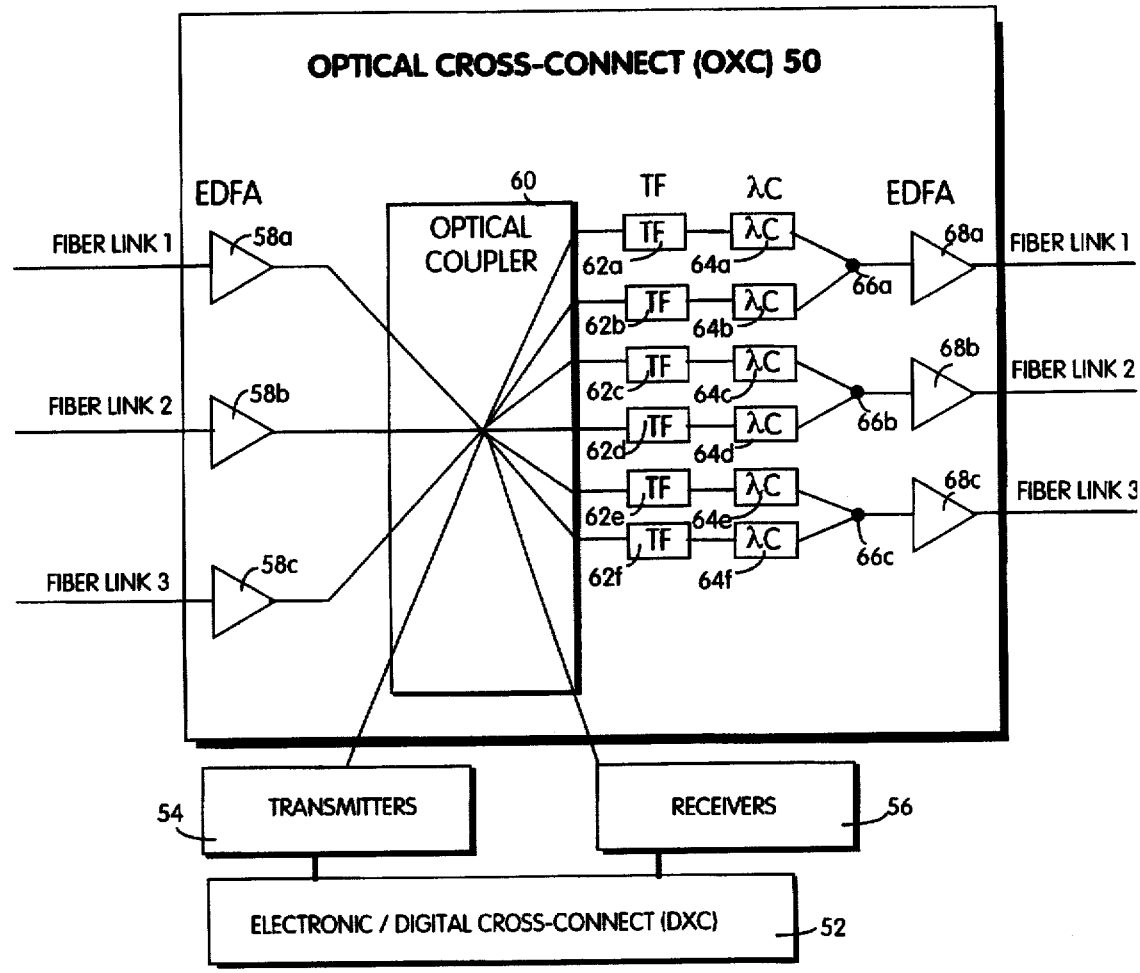
FIG. 4 is a function block diagram of an optical cross-connect that employs wavelength switching in accordance with one embodiment of the present invention.

The optical cross-connect architectures disclosed in FIGS. 4 and 8 are non-blocking, prevent wavelength channel contention, and are both link and wavelength modular. As a result, additional input and output fiber links can be simply inserted with each new fiber having, for the architecture in FIG. 4, an additional corresponding tunable filter 62 and wavelength converter 64 pair. For the architecture in FIG. 8, another wavelength converter 70 is also added. Such link and corresponding link component additions do not affect or change the pre-existing optical cross-connect node components or the node's basic structure, and as a result, the optical cross-connect is link modular.

Similarly, new wavelength channels may be individually and modularly added to the existing comb of wavelength channels on each input fiber. An added wavelength channel simply requires the addition of a tunable filter/wavelength converter pair. The total number of added filter/converter pairs equals the total number of added wavelengths without any change to the pre-existing devices. Accordingly, the optical cross-connect is wavelength modular.

In instances where the optical coupler 60 is overdimensioned and has additional input and output ports, new links and wavelengths can be added without any change to the pre-existing OXC. Even if a higher capacity optical coupler is required to add new links and/or wavelengths, that higher capacity optical coupler is substituted for the existing coupler. The only hardware changes would be to disconnect and reconnect to the input and output coupler ports. The optical coupler is by far the least expensive component in the OXC and is certainly much more economically replaced than an optical space switch. As a result, the optical cross-connect can be upgraded without traffic disruption and with minimum incremental costs as the market demands.

Using the OXC architecture of the present invention, the optical cross-connect nodes are not network bottle-necks. In addition, in future networks such as broadband-ISDN (B-ISDN) whose initial traffic demands will likely be low, communication networks can be flexibly and economically upgraded with an optical path layer while also supporting future growth and incremental investment as traffic demands increase. The optical cross-connect architectures of the present invention offer high link and wavelength modularity. Additional links may be added to the OXC simply by adding a number of components or modules that match the number of additional links. Similarly, when adding plural wavelengths, the number of components corresponds directly to the number of additional wavelengths. The upgrading expense is confined to the cost the new link and the associated components and possibly a new optical coupler. The node architecture need not be redesigned, nor do expensive space switches need to be purchased. As already described, another advantage of these architectures is that they minimize the number of total wavelengths used in the network because they employ a virtual path wavelength technique that relies on wavelength switching rather than allocating one wavelength for every channel in the network.

Both architectures directly support the possible routing of a given wavelength channel to more than one output fiber, i.e., multicasting. Moreover, any multicasted signal can travel on any wavelength independent of originating wavelength and of the other multicasted signals. This is particularly attractive for applications that require transport of signals from a production center to several access nodes in different geographic locations, e.g., broadcasting television signals. Because FWM SOA wavelength converters can translate analog signals as well as digital signals, the present invention finds particular application to multicasting of television signals over transport networks.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A single stage optical cross-connect node for routing and switching wavelength communications channels at high speed, the single stage comprising:

plural optical fiber input links and output links, each link containing plural wavelength channels;

a single optical star coupler having an input port for each input link and plural output ports for combining all of the wavelength channels received from all of the input links and providing the combined signal so that all of the input wavelength channels are available at each output port of the optical star coupler;

tunable optical filters, each connected to one of the optical star coupler output ports for selecting one of all of the input wavelength channels received on all of the input links;

optical wavelength converters, each corresponding and connected to each tunable optical filter for translating the selected wavelength channel to a different wavelength channel; and optical combiners for combining selected wavelength channels generated by the wavelength converters onto corresponding optical fiber output links, wherein the optical star coupler, tunable optical filters, optical wavelength converters, and optical combiners are included in the single stage.

2. The optical cross connect node in claim 1, wherein the wavelength channels are switched in the node without a space switch.

3. The optical cross connect node in claim 1, wherein additional fiber links and/or additional wavelength channels may be individually added to the optical cross-connect node by adding one new tunable filter and wavelength converter for each newly added fiber link and/or wavelength channel.

4. The optical cross connect node in claim 1, wherein the wavelength converters are four wave mixing semiconductor optical amplifiers.

5. The optical cross-connect node in claim 1, wherein the optical cross-connect is connected to an electronic cross-connect through the optical coupler.

6. The optical cross-connect node in claim 1, wherein one wavelength channel is routed by plural one of the tunable filters to plural output fiber links.

7. The optical cross-connect node in claim 6, wherein the one wavelength channel routed to plural output fiber links contains analog signals.

8. An optical cross-connect node for routing and switching wavelength communications channels at high speed, comprising:

plural optical fiber input links and output links each containing a comb of plural wavelength channels;

input wavelength converters, each connected to one of the input links being capable of converting a comb of plural wavelength channels to another comb of wavelength channels;

an optical coupler having an input port for each input link and plural output ports;

tunable optical filters, each connected to one of the optical coupler output ports for selecting a wavelength channel from the optical coupler;

output optical wavelength converters, each connected to a corresponding tunable optical filter for converting the selected wavelength channel to a different wavelength channel; and optical combiners combining wavelength channels generated by some of the wavelength converters onto corresponding ones of the optical fiber output links.

9. The optical cross-connect node of claim 8, wherein additional fiber links may be individually added to the optical cross-connect node by adding one new input wavelength converter, one new tunable filter, and one new output wavelength converter for each newly added fiber link.

10. The optical cross-connect node of claim 8, wherein additional wavelength channels may be individually added to existing fiber links of the optical cross-connect node by adding one new tunable filter and one new output wavelength converter for each newly added wavelength channel.

11. The optical cross-connect node of claim 8, wherein the input wavelength converters selectively convert combs of wavelength channels on each input fiber link to different combs of wavelength channels to avoid wavelength contentions in the optical coupler.

12. The optical cross-connect node of claim 10, wherein the output wavelength converters restore the wavelengths selected by the tunable filters to the wavelengths used on the input fiber links.

13. The optical cross connect node in claim 8, wherein the wavelength channels are switched in the node without a space switch.

14. The optical cross connect node in claim 8, wherein the wavelength converters are four wave mixing semiconductor optical amplifiers.

15. The optical cross-connect node in claim 8, wherein the optical cross-connect is connected to an electronic cross-connect through the optical coupler.

16. The optical cross-connect node in claim 8, wherein both new fiber links and new wavelength channels can be added as modules with minimal impact on existing components already in the node.

17. The optical cross-connect node in claim 8, wherein one wavelength channel is routed by plural ones of the tunable filters to plural output fiber links.

18. The optical cross-connect node in claim 17, wherein the one wavelength channel routed to plural output fiber links contains analog signals.

19. A method of adding fiber optic links to an existing single stage optical cross-connect node that includes plural optical fiber input links and output links each containing plural wavelength channels, a single optical star coupler having an input port for each input link and plural output ports for combining all of the wavelength channels received from all of the input links and broadcasting the combined signal so that all of the input wavelength channels are available at each output port of the optical star coupler; tunable optical filters, each connected to one of the optical coupler output ports for selecting one of all of the input wavelength channels received on all of the input links; optical wavelength converters, each corresponding and connected to a tunable optical filter for translating the selected wavelength channel to a different wavelength channel; and optical combiners for combining selected wavelength channels generated by the wavelength converters onto corresponding optical fiber output links, comprising the steps of:

determining a number of links to be added, and for each link to be added, coupling the link to an available input port of the optical star coupler, coupling an additional tunable filter and corresponding wavelength converter to an available output port of the optical star coupler, and connecting an output from the additional wavelength converter to an optical combiner.

20. The method in claim 19, further comprising:

determining if the optical star coupler includes additional capacity to handle an additional fiber link and/or an additional wavelength channel, and if there is insufficient capacity, replacing the optical star coupler with a new, larger capacity optical star coupler.

21. The method in claim 19, further comprising:

adding a new wavelength channel to an existing optical fiber of the optical cross-connect node by adding an additional tunable filter and corresponding wavelength converter to an available output port of the optical star coupler, and connecting an output from the additional wavelength converter to an optical combiner.

22. A method of adding fiber optic links to an existing optical cross-connect node that includes plural optical fiber input links and output links each containing plural wavelength channels; input wavelength converters, each connected to one of the input links being capable of converting a comb of plural wavelength channels to another comb of wavelength channels; an optical coupler having an input port for each input link and plural output ports; tunable optical filters, each connected to one of the optical coupler output ports for selecting a wavelength channel from the optical coupler; output optical wavelength converters, each corresponding and connected to each tunable optical filter for translating the selected wavelength channel to a different wavelength channel; and optical combiners for combining selected wavelength channels generated by the wavelength converters onto corresponding optical fiber output links, comprising the steps of:

determining a number of links to be added, and for each link to be added, coupling the link through an additional input wavelength converter to an available input port of the optical coupler, coupling an additional tunable filter and corresponding output wavelength converter to an available output port of the optical coupler, and connecting an output from the additional wavelength converter to an optical combiner.

23. The method in claim 22, further comprising:

determining if the optical coupler includes additional capacity to handle an additional fiber link and/or an additional wavelength channel, and if there is insufficient capacity, replacing the optical coupler with a new, larger capacity optical coupler.

24. The method in claim 22, further comprising:

adding a new wavelength channel to an existing optical fiber of the optical cross-connect node by adding an additional tunable filter and corresponding wavelength converter to an available output port of the optical coupler, and connecting an output from the additional wavelength converter to an optical combiner.

25. In a transport network containing plural optical cross-connect nodes, each optical cross-connect node including: plural optical fiber input links and output links each containing plural wavelength channels, an optical coupler having an input port for each input link and plural output ports; tunable optical filters, each connected to one of the optical coupler output ports for selecting a wavelength channel; optical wavelength converters, each corresponding and connected to a tunable optical filter for translating the selected wavelength channel to a different wavelength channel; and optical combiners for combining selected wavelength channels generated by the wavelength converters onto corresponding optical fiber output links, a method comprising routing an input wavelength channel to plural output fibers and broadcasting the input wavelength channel from one optical cross-connect node over the transport network to other cross-connect nodes located in different geographical locations, wherein each optical cross-connect node further includes input wavelength converters each connected to one of the input links such that the input wavelength channel may be translated to other wavelength channels on the plural output fibers.

26. The method in claim 25, wherein the input wavelength converters each are capable of translating a comb of plural wavelength channels to another comb of wavelength channels.

27. The method in claim 26, wherein signals on the input wavelength channel include analog signals.

* * * * *